United States Patent [19]

Stonehocker

[11] Patent Number: 5,010,487
[45] Date of Patent: Apr. 23, 1991

[54] COMPUTER-BASED ENGINE DIAGNOSTIC METHOD

[75] Inventor: Van T. Stonehocker, Beloit, Wis.

[73] Assignee: Coltec Industries Inc., New York, N.Y.

[21] Appl. No.: 317,893

[22] Filed: Mar. 2, 1989

[51] Int. Cl.$^5$ ...................... G01M 15/00; G06F 15/40
[52] U.S. Cl. ........................... 364/424.03; 364/431.01
[58] Field of Search ...................... 364/424.03, 424.04, 364/550, 551.01; 340/146.2

[56] References Cited

U.S. PATENT DOCUMENTS

| | | | |
|---|---|---|---|
| 3,034,102 | 5/1962 | Armstrong et al. | 340/146.2 |
| 3,740,538 | 6/1973 | Hemphill | 340/146.2 |
| 4,267,569 | 5/1981 | Baumann et al. | 364/424.04 |
| 4,441,359 | 4/1984 | Ezoe | 364/424.03 |
| 4,694,408 | 9/1987 | Zaleski | 364/424.03 |

FOREIGN PATENT DOCUMENTS

| | | | |
|---|---|---|---|
| 58-82358 | 5/1983 | Japan | 364/424.04 |
| 62-6855 | 1/1987 | Japan | 364/424.04 |
| 62-6858 | 1/1987 | Japan | 364/424.04 |

OTHER PUBLICATIONS

Olsson et al., Beyond Simple Measurements On-Board Monitor for Vehicle Prognosis, Conf. Instr. in the Aerospace Industry, pp. 271-280, May 1980.
Ford Corporation: 1975 Car Shop Manual Supplement, pp. 29-02-2-6, 11-17, 25, 26 as examples.
Colt Arrow 1977 Service Manual, pp. 5-3, 5-4, 9-2, 9-3, 11-3, 22-1 as examples.

Primary Examiner—Felix D. Gruber
Attorney, Agent, or Firm—Howard S. Reiter

[57] ABSTRACT

This invention is a computer-based engine-diagnostic method wherein there are provided lists of observable engine faults and causes for each observable engine fault. A user inputs one or more observed engine faults, and the software responds by displaying, in decreasing order by number of occurrences, causes which are common to two or more of the observed engine faults. Thus, the most probable causes for the observed engine faults appear at the head of the display. Additionally, once a probable cause is determined, the software is enabled to display other engine faults which should be observable, given the selected cause.

4 Claims, 3 Drawing Sheets

MULTIPLE FAULT ANALYSIS

FIG. IA.

ENGINE DIAGNOSTICS PROGRAM

```
IDENTIFY ENGINE MODEL (NOT NEEDED IF SINGLE-ENGINE PROGRAM)
GET REMEDY DATA FILE
GET FAULT DATA FILE
GET CAUSE DATA FILE
DISPLAY MAIN MENU
<ENTER SELECTION>
IF SELECTION = 1 ──▶ (SINGLE FAULT)
    :                 DISPLAY INSTRUCTIONS
    :                 DISPLAY LIST OF FAULTS  ◀─────────┐
    :                 <ENTER FAULT SELECTION>           │
    :                 IF <RETURN> ──▶ GO TO NEXT PAGE ──┘
    :
    :           ──▶ DISPLAY FAULT WITH POSSIBLE CAUSES AND/OR ◀──┐
    :               ASSOCIATED OTHER FAULTS                       │
    :               <ENTER "MOST LIKE CAUSE">                     │
    :               <ENTER "F" TO VIEW ASSOCIATED FAULTS> OR      │
    :               <ENTER "R" TO VIEW ASSOCIATED REMEDY>         │
    :                                                             │
    :               IF "F" ──▶ DISPLAY FAULT W/SELECTED           │
    :                   :      CAUSE & OTHER ASSOCIATED           │
    :                   :      FAULTS                             │
    :                   :      <SELECT OTHER FAULT>               │
    :                   :      IF <RETURN>      > GO TO           │
    :                   :      MENU ABOVE (NEW FAULT) >───────────┤
    :               (IF "R")                                      │
    :               DISPLAY FAULT W/SELECTED                      │
    :               CAUSE AND ASSOCIATED REMEDY                   │
    :               ────────────< CONTINUE WITH SAME FAULT >──────┘
IF SELECTION = 3 ──▶ (CAUSE SELECTION)
    :                 DISPLAY INSTRUCTIONS
    :                 DISPLAY LIST OF CAUSES (SEVERAL PAGES) ◀────┐
    :                 <ENTER SELECTION>                           │
    :                 IF <RETURN> ──▶ GO TO NEXT PAGE ────────────┘
    :
    :                 DISPLAY SELECTED CAUSE W/ASSOCIATED FAULTS
    :                 <ENTER SELECTION>
    :                 IF <RETURN>  ──▶ GO TO MENU ABOVE
    :                 (GO TO FAULT SECTION WITH SELECTED FAULT)
    :                 (PROGRAM RECYCLES PER FAULT FLOW CHART).>───
```

FIG. 1B.

```
IF SELECTION = 2 ──▶ (MULTIPLE FAULTS)
    :                DISPLAY INSTRUCTIONS
    :                DISPLAY LIST OF FAULTS ◀───────────┐
    :                < ENTER SELECTION >                │
    :                IF < RETURN > ────▶ GO TO NEXT PAGE ┘
    :                (OR RESPOND TO "IS THAT END OF YOUR INPUT....."
    :                :
    :                DISPLAY FAULTS (INPUT FROM ABOVE)
    :                DISPLAY CAUSES < IN ORDER OF % COINCIDENCE)
    :                DISPLAY OTHER CAUSES (W/NO COINCIDENCE)
    :                RESPOND TO QUESTION ON PRINT OUT
    :                IF YES ─────────▶ PRINT OUT MATRIX CHART
    :                RETURN TO MENU ABOVE.
    :
    :
IF SELECTION = 4 ──▶ (NEW FILE DATA)
    :                GET NEW FILE DATA (FOR ANOTHER ENGINE)
    :                RETURN TO MAIN MENU ABOVE
    :                (THIS SECTION DOES NOT EXIST IN THE SINGLE-
    :                ENGINE PROGRAM).
    :
IF SELECTION = 5 ──▶ (END PROGRAM)

PROGRAM ENDS.
```

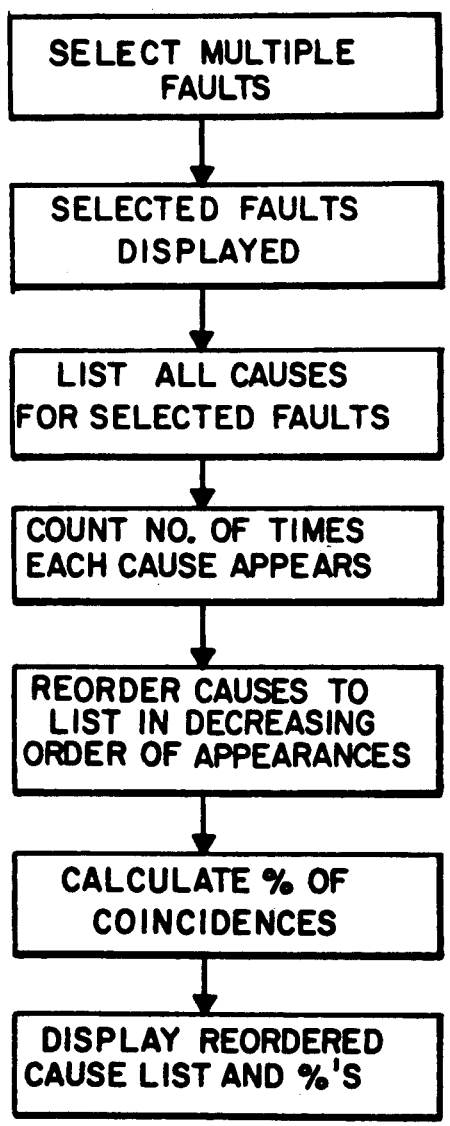

COMPUTER-BASED ENGINE DIAGNOSTIC METHOD

FIELD OF THE INVENTION

This invention relates to computer-based analysis systems and, more particularly, to a computer-based engine diagnostic method, particularly adapted for use by engine-user personnel.

BACKGROUND OF THE INVENTION

Many industries today employ stand-by engine-generator systems for emergency use. One such industry is the nuclear power industry, which employs such systems for stand-by power generation. Since the stand-by engine-generators are not run on a continuous basis, the personnel assigned to maintain those systems are inexperienced when it comes to analyzing fault symptoms and determining their causes. For example, such engine-generators are often not operated for long enough periods and often enough to establish system base line operating conditions for the systems. Thus, the operators are unable to tell how far from the base line the engine's operation really is until it develops serious problems.

Manufacturers have heretofore provided the users with troubleshooting manuals, which provide "trouble indications", lists of malfunction "causes" therefor, and suggested "corrections". The difficulty presented by such publications is that one cause can result in a number of "trouble indications", thereby leaving the maintenance personnel in some confusion. Moreover, the maintenance personnel generally attempt to follow the first suggested remedy, rather than looking at all of the trouble indications and making a reasoned analysis.

This problem is especially acute in large-size diesel-generator systems which remain on stand-by for long periods of time. It is common in such engines that a single malfunction (i.e., cause) can result in a number of trouble indications. For instance, defective injection nozzles can result in high exhaust temperatures for all cylinders, an unusual change in individual cylinder exhaust temperatures, dark brown exhaust smoke, etc. Likewise, while excessive exhaust temperatures are indicative of defective injection nozzles, they may also result from incorrect injection timing, poor quality fuel oil, pyrometer error, excessive internal friction, port carbon deposits, incorrect crank lead, etc., etc. Maintenance publications are unable, in a reasonable manner, to take into account all of the combinations and permutations of possible trouble indications and causes and properly correlate them.

Accordingly, it is an object of this invention to provide a computer software system for engine trouble diagnosis, which provides a ranking of probable causes for a particular trouble indication.

It is still another object of this invention to provide a computer-based engine-diagnostic system wherein, once the diagnosis has been made from a particular indication, that the software displays other indications which ought to be observable from a determined cause.

SUMMARY OF THE INVENTION

This invention is a computer-based diagnostic method wherein there are provided lists of observable product faults and causes for each observable product fault. A user inputs one or more observed product fault(s), and the software responds by displaying, in decreasing order by number of occurrences, causes which are common to two or more of the observed product faults. Thus, the most probable causes for the observed product fault(s) appear at the head of the display. Additionally, once a probable cause is determined, the software is enabled to display other product faults which should be observable, given the selected cause.

DESCRIPTION OF THE DRAWINGS

FIGS. 1a and 1b are high level flow diagrams of the engine diagnostic program of this invention.

FIG. 2 is a sub-routine which enables a ranking of causes for two or more observed engine faults, whereby the most probable cause is placed at the head of the list of causes.

DETAILED DESCRIPTION OF THE INVENTION

This invention comprises a product (i.e., engine) diagnostics program which enables an unsophisticated user to determine a cause or causes of certain observed faults (i.e., trouble indications), and to then determine the preferred corrective action. The program includes three major files, i.e., a fault file, a cause file, and a remedy file. Each of the files is similar in structure and is configured to be able run on an IBM personal computer or its equivalent.

The fault file includes all expected trouble indications for a particular type or types of engines. Each fault is associated with its possible causes. In the program, up to 20 causes understood that this limitation and other numerical limitations hereinbelow discussed are not to be thought of as limiting the invention, but are merely utilized for explanatory purposes.

Each fault record includes a first field which incorporates a description of the fault, which first field is followed by 20 additional fields. If a positive number is resident in one of those fields, it indicates a cross-reference to an associated cause. If a negative number is included in one of the fields, it is a cross-reference to an associated fault. An associated fault is one whose cause is similar to or identical to the principal fault. If a zero appears in the field, it indicates the end of the record.

The cause file contains a listing of causes, each of which may be associated with up to 20 faults. Each cause is also associated with one remedy. For each cause, there are 22 fields per record, with the first field including the cause description, and the second field including a cross-reference to a particular remedy. A positive number in any of the next 20 fields indicates a cross-reference to an associated fault. A zero or negative number in any of the aforementioned fields indicates an end of record marker.

The remedy file incorporates a listing and description of particular remedies for the engine model and any one particular remedy may be associated with more than one cause. The remedy field includes one field which incorporates a description of the remedy.

The program of the invention is applicable to a single engine model or to multiple engine models. In the multiple engine version of the program, the particular fault, cause, and remedy files associated with the particular engine model must first be accessed before the program can be operated.

Referring to FIG. 1a, the diagnostics program commences by accessing the remedy, fault and cause data file. A main menu is then displayed as follows:

1. Pick a fault
2. Pick multiple faults
3. Pick a cause
4. Change engine type
5. Exit program The above noted menu enables the user to enter the program knowing a cause and then looking for a remedy or an associated observable fault. In addition, the user can enter the program by knowing an observed fault and looking for the cause and a possible remedy. If the user selects line 1 of the menu, the program displays a list of faults and the user enters a fault selection. That fault is then displayed with its possible causes. That listing also includes cross references to associated observable faults, which should be examined to determine if the user has overlooked them in the analysis of the engine's problems. The user may then select the "most likely cause" and enter "F" to view the associated faults or enter "R" to view the associated remedy for the found cause.

Once the user has accessed a fault and found its possible causes, preferably its most likely cause, the user selects the particular cause which was isolated as above described. Then that cause, along with its associated faults, is displayed so that the user can determine which other observable faults exist with respect to the particularly chosen cause. This enables the user to confirm the diagnosis of the engine problem by determining if all of the indicated faults are present in the engine. If not, the diagnosis may be in error. If they are, the diagnosis is confirmed. Thus, the user is able to come at the problem from two directions through the use of this program; i.e., from the direction of an observed fault (which enables the cause or causes of the fault to be identified), and also from the direction of a supposed cause and the faults which it manifests. This last method is accessed by menu item, line 3.

If the user observes multiple faults, Line 2 of the menu is selected (see FIG. 1b), and the observed faults are specified when the complete list of faults are displayed. Then, the specified faults are indicated on the display, and the program branches to a sub-routine shown in FIG. 2. Once the multiple faults are selected by the user and displayed for confirmation purposes, the program accesses all causes for each of the specified faults. Then, like causes are grouped, counted, and the counts for like causes are accumulated, so that the number of times each particular cause appears in the list is found. Then, the program reorders the list of causes to indicate them in decreasing order of number of appearances in the list. A calculation is then made to determine the ratio of the number of appearances of each cause to the total number of causes, with the result being displayed for the user. Thus, the system determines from all of the specified faults, all of the possible causes for the faults, and ranks them in accordance with their frequency of occurrence. The program them continues to display any other causes which appear on the list only a single time, so as to provide a complete indication to the user of all possible causes in ranking order for the indicated engine fault or faults. This ranking provides a correlation which indicates the most likely cause for the malfunction and enables the remedy therefore to be obtained. The last described list of faults and ranked causes may also be printed out.

If the user selects menu item 4, the program accesses new file data for another engine, and the main menu then returns to the display for subsequent selection. If the program is for a single engine, this selection item is not present on the menu. The fifth menu line merely exits the program.

It should be understood that the aforegoing description is only illustrative of the invention. Various alternatives and modifications can be devised by those skilled in the art without departing from the invention. Accordingly, the present invention is intended to embrace all such alternatives, modifications, and variances which fall within the scope of the appended claims. It should also be understood that this methodology is equally applicable to devices other than engines in which faults, causes and remedies may be associated.

I claim:

1. A system including a computer and a software program for providing product diagnostic information to a user, said system performing the method comprising the steps of:

storing a list of observable product faults;

storing a list of causes for each observable product fault;

displaying from said list of stored faults a group of two or more observable product faults;

and in response to a user indication of at least two said observable product faults, displaying in decreasing order by number of occurrences, causes which are common to said user-indication of observed product faults, whereby the most probable cause for said observed product faults occurs at the head of said displayed group of product faults.

2. The method as described in claim 1 further including the steps of:

storing a list of remedies for said causes;

displaying, upon user request, the remedy for each said displayed cause.

3. The method as described in claim 2 further including the step of:

displaying all causes of one observed product fault in addition to said displayed causes common to said observed product faults.

4. The method as described in claim 1 further including the step of:

displaying all associated product faults related to said probable cause, to enable a user to determine if all associated observable product faults have been identified.

* * * * *